(No Model.)
H. C. PEDERSEN.
THRUST BEARING FOR PROPELLER SHAFTS.
No. 494,024. Patented Mar. 21, 1893.
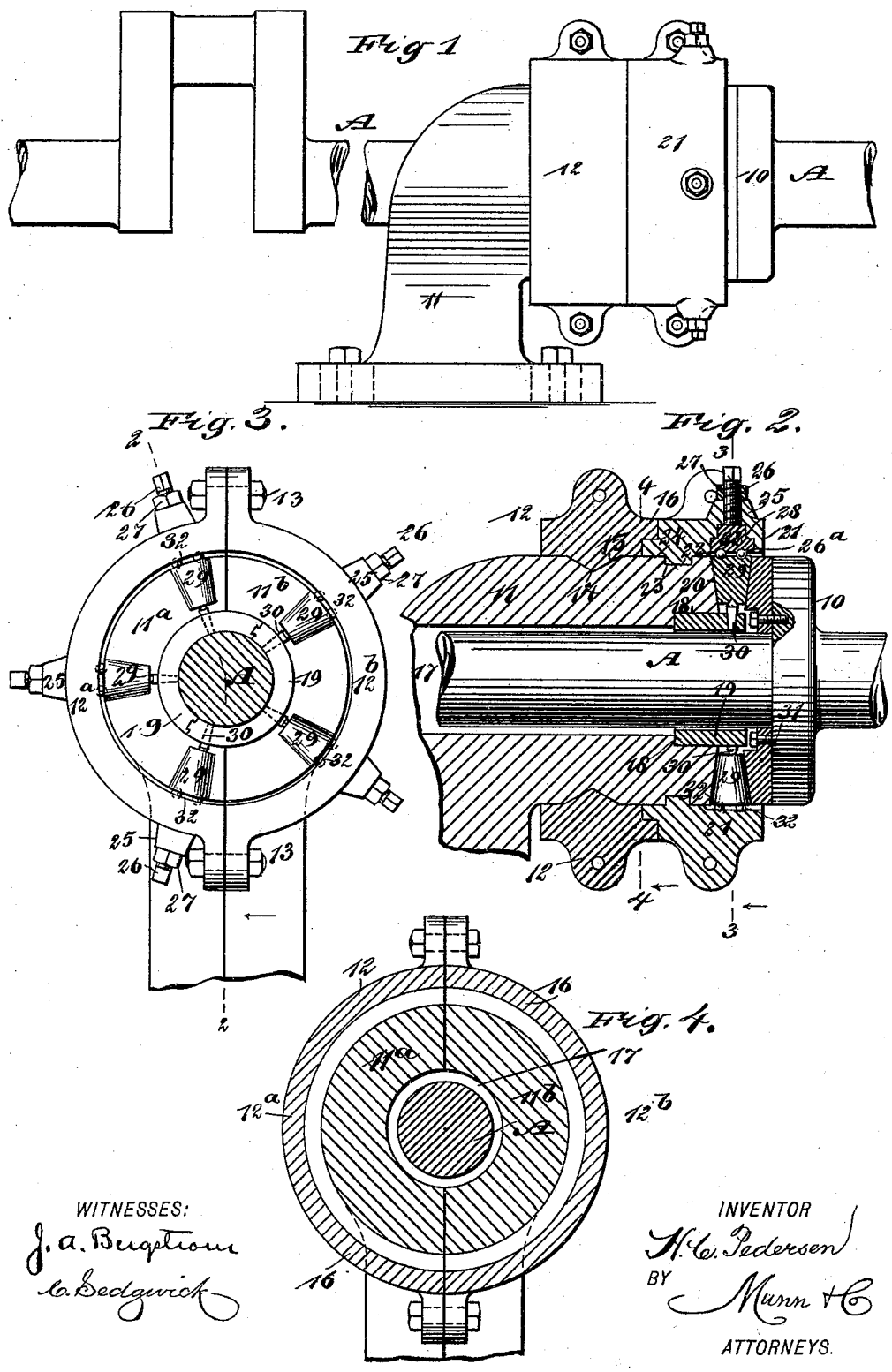
WITNESSES:
J. A. Bergstrom
C. Sedgwick
INVENTOR
H. C. Pedersen
BY
Munn & Co
ATTORNEYS.

UNITED STATES PATENT OFFICE.

HANS C. PEDERSEN, OF BROOKLYN, NEW YORK.

THRUST-BEARING FOR PROPELLER-SHAFTS.

SPECIFICATION forming part of Letters Patent No. 494,024, dated March 21, 1893.

Application filed July 20, 1892. Serial No. 440,597. (No model.)

*To all whom it may concern:*

Be it known that I, HANS CHRISTIAN PEDERSEN, of Brooklyn, in the county of Kings and State of New York, have invented a new and useful Improvement in Thrust-Bearings for Propeller-Shafts, of which the following is a full, clear, and exact description.

My invention relates to an improvement in thrust bearings for propeller shafts, and has for its object to provide a bearing which will receive the collar of the propeller shaft with the least possible amount of friction, and to so construct the bearing that the friction between the shaft and the bearing will be so greatly reduced as to render the bearing practically frictionless.

A further object of the invention is to construct the bearing in an economic and durable manner and in such a way that access may be had to any of its parts conveniently and expeditiously.

A further object of the invention is to provide a bearing readily adaptable to any propeller shaft.

The invention consists in the novel construction and combination of the several parts, as will be hereinafter fully set forth and pointed out in the claims.

Reference is to be had to the accompanying drawings forming a part of this specification, in which similar figures and letters of reference indicate corresponding parts in all the views.

Figure 1 is an exterior view of the thrust block and a portion of the propeller shaft. Fig. 2 is a section taken through the thrust block and the bearing thereof, the section being taken essentially on the line 2—2 of Fig. 3. Fig. 3 is a vertical section taken through the shaft, the section being taken practically on the line 3—3 of Fig. 2 in front of the conical rollers of the bearing; and Fig. 4 is a section taken vertically through the thrust block, the shaft and the collar of the block, the section being indicated by the line 4—4 in Fig. 2.

The propeller shaft A is the ordinary shaft, and is provided with the usual collar 10, adapted for engagement with the thrust block 11. The thrust block is made in two sections $11^a$ and $11^b$, one of which may be readily placed around the shaft or removed therefrom, the two sections of the block being preferably brought together over the top and bottom portions of the shaft. The block sections are held in place through the medium of a sleeve 12, and this sleeve is made likewise in two sections $12^a$ and $12^b$, the sections being connected by means of bolts 13 or their equivalents; and the sections of the sleeve are placed upon the block in the same manner that the block is placed around the shaft. The block is preferably provided with an exterior angular groove 14, as shown in Fig. 2, to receive the correspondingly shaped tongue 15, produced in the under central portion of the sleeve, in order that the sleeve cannot possibly slip from the block. The sleeve is also provided at its forward edge with a flange 16, likewise shown in Fig. 2, the flange being located at the outer or upper portion of the sleeve; and the bore 17 in the thrust block receiving the shaft A is of greater diameter than the diameter of the shaft.

At the outer end of the thrust block, or that adapted to face the collar 10 of the shaft, an interior annular recess 18, is produced, and this recess receives a sleeve 19, also made in two sections and fitted closely to the shaft, so closely that the shaft and the sleeve turn together. The sleeve extends outward beyond the outer edge of the thrust block, as shown in Fig. 2, and the outer end face of the thrust block is beveled upward, forming an inclined wall 20, as is likewise shown in Fig. 2.

A collar 21, extends around the forward portion of the exterior surface of the thrust block in front of the binding or locking sleeve 12. The collar 21, is adapted to turn or revolve upon the thrust block, and in order that it may not have lateral play the inner face of the collar is provided with an annular rib 22, preferably of rectangular shape in cross section, which rib fits in a correspondingly shaped channel 23, produced exteriorly upon the thrust block. A flange 24, is formed upon the inner face of the collar 21, at the lower edge thereof, and this flange is adapted to fit between the flange 16 of the locking sleeve 12 and the outer surface of the thrust block beneath that flange, as is likewise shown in Fig. 2.

The collar 21, is exteriorly provided with a series of offsets 25; each offset is hollow and receives a screw 26, the upper end of the screw extending beyond the offset, and is provided with a head whereby it may be turned by means of a wrench. Each screw passes through a jam nut 27, the nuts resting upon the tops of the offsets, and beneath each offset a recess 28, is formed, preferably polygonal in cross section, and ordinarily in two diameters, the lower portion of the recess being of the greatest area, and each screw 26 has a bearing upon a block 26ª of a contour corresponding to the contour of the recess 28 into which it is fitted. A block is located in each recess 28, and when so entered the under face of the block will be flush with the inner surface of the collar, as the under surfaces of all of the blocks are more or less concaved.

The collar 21, extends over the outer inclined edge 20 of the thrust block, and the inner edge of the foot of each screw is located immediately over the upper portion of said inclined edge 20; and below the foot of each adjusting screw 26 a conical friction roller 29, is placed, and each of these friction rollers is pivoted at its lower or inner end upon a center pin 30, the said pins being securely fixed in the sleeve 19 surrounding the shaft. The taper of the friction rollers 29 corresponds to the inclination of the edge 20 of the thrust block; therefore the sides of the friction rollers are constantly in engagement with the inclined surface 20 of the block, as shown in Figs. 2 and 3.

In order that the device may be applied to the collar 10 of any propeller shaft a plate 31, is secured to the inner face of the collar by means of screws or otherwise; and near the center of this plate, which is provided with an opening through which the shaft passes, the plate is of less thickness than at any other point; and the inner face of the thicker portion of the plate is inclined in a direction the reverse of the inclined wall 20, and this inclined face of the plate 31, is adapted to be brought in close engagement with the friction rollers 29.

Between the upper or outer faces of the friction rollers and the screw-controlled block 26ª immediately above the rollers, balls 32 are placed, in order that the rollers 29 may turn with the least possible amount of friction; and should the rollers wear from constant use the screws 26 may be forced downward and the rollers wedged more tightly and evenly in their seats.

By means of the bearings above described the shaft is enabled to turn in the thrust block with the least possible amount of friction, and therefore the lateral strain which is sustained by the thrust block is to a great extent lessened. The bearing may be oiled in any approved manner, and if in practice it is found desirable the entire bearing may be made to turn in an oil bath.

It is evident that as the shaft revolves the sleeve 19 will turn with it, and likewise the friction rollers 29 and the collar 21, as all of these parts are more or less connected.

It is evident that the parts of the bearing may be quickly placed in position, and if an accident should happen to it any part may be substituted by a new one; and it is also evident that anti-friction balls may be placed, if desired, between the inner surface of the collar 21 and the outer surface of the thrust block.

Having thus described my invention, I claim as new and desire to secure by Letters Patent—

1. The combination, with a thrust block, a sleeve held to revolve in the outer end of the thrust block and adapted for frictional engagement with the propeller shaft, and a collar having rotary movement upon the exterior of the thrust block and extending beyond its outer edge, the said collar being provided with recesses formed in its inner face, of adjustable blocks fitted in the recesses in the collar, friction rollers pivoted upon centers carried by the sleeve and adapted for engagement with the outer end of the thrust block and the collar of the propeller shaft, and balls interposed between the outer ends of the friction rollers and the inner or under surfaces of the adjustable blocks carried by the collar, substantially as and for the purpose set forth.

2. The combination, with a thrust block having an inclined surface at one end, a propeller shaft turning in said block, the collar of which faces the inclined end of the block, and a loose collar held to turn upon the thrust block, of a plate secured to the shaft collar, having an inclined surface facing that of the thrust block, the incline being in the opposite direction, adjusting devices carried by the loose collar of the block, conical friction rollers located beneath the adjusting devices and in engagement with the inclined surfaces of the thrust block and plate, a sleeve in frictional engagement with the shaft, centers carried by the sleeve and journaling the end surfaces of the friction rollers, and balls located upon the outer end surfaces of the friction rollers, the said balls being engaged also by the said adjusting devices carried by the collar, as and for the purpose set forth.

HANS C. PEDERSEN.

Witnesses:
OSCAR A. BOCH,
HENRY A. PIKE.